Jan. 26, 1960    H. E. ENGLESON ET AL    2,922,504
DETECTOR MECHANISM
Filed Feb. 1, 1956    3 Sheets-Sheet 1
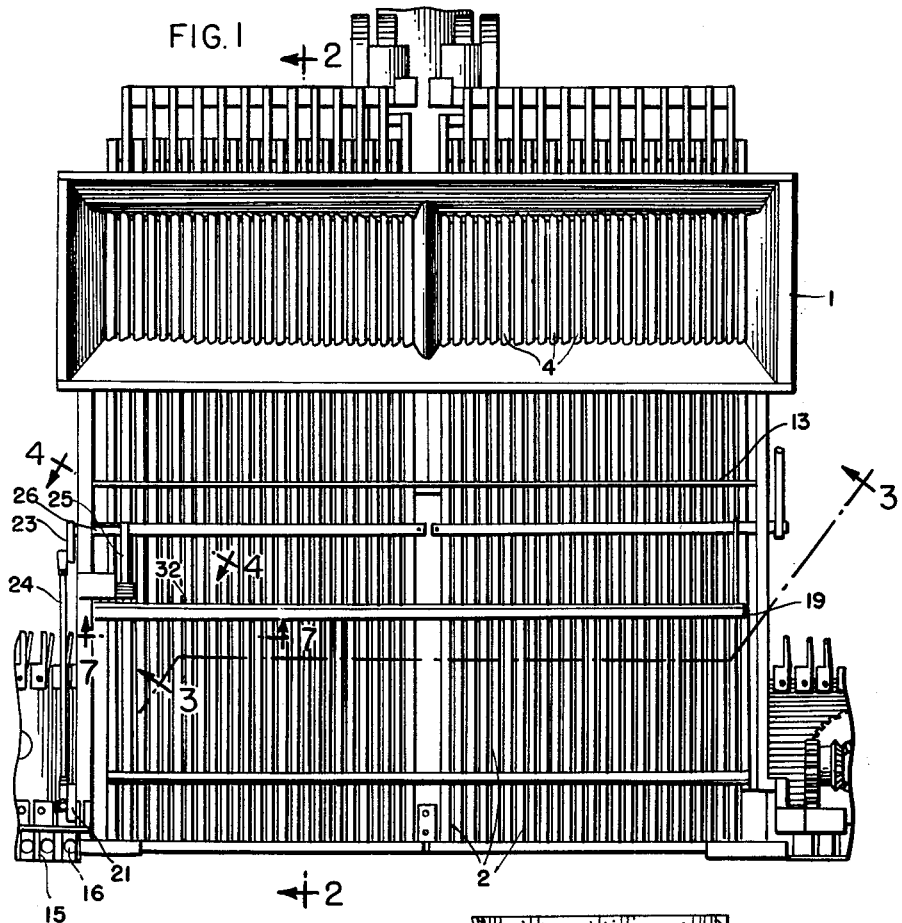
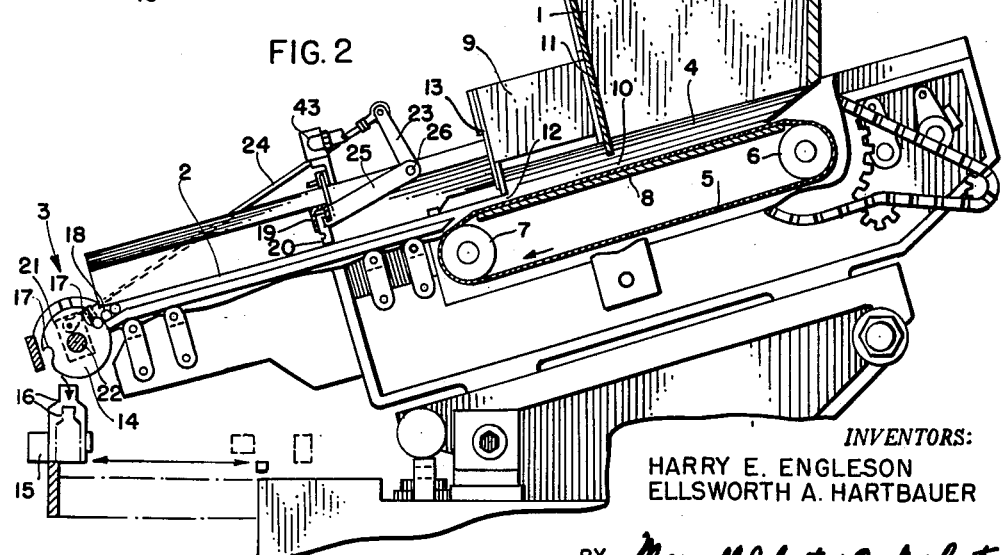
INVENTORS:
HARRY E. ENGLESON
ELLSWORTH A. HARTBAUER
BY *Marzall, Johnston, Cook + Root*
ATT'YS

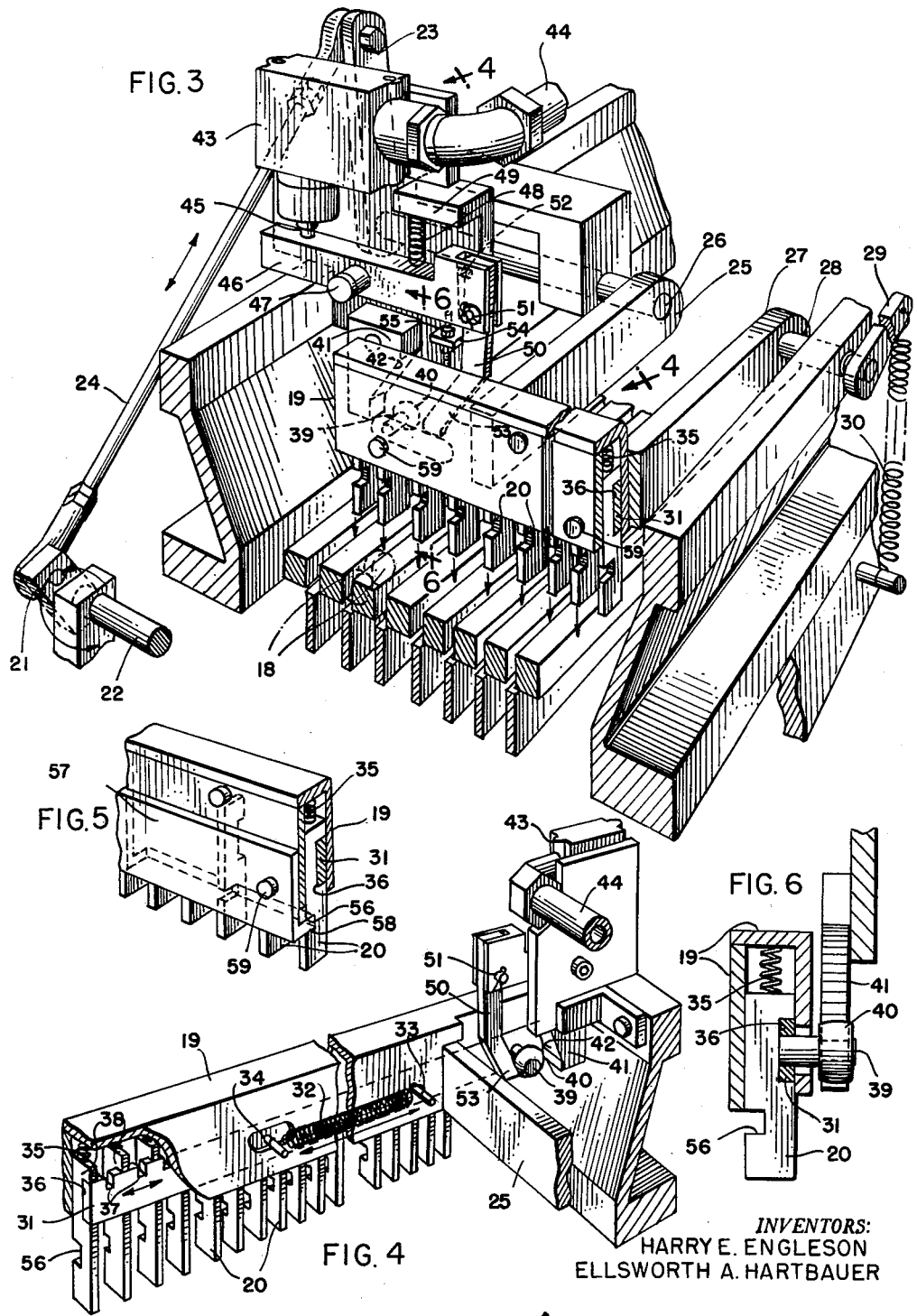

Jan. 26, 1960    H. E. ENGLESON ET AL    2,922,504
DETECTOR MECHANISM
Filed Feb. 1, 1956    3 Sheets-Sheet 3

INVENTORS:
HARRY E. ENGLESON
ELLSWORTH A. HARTBAUER

BY *Margall, Johnston, Cook + Root*
ATT'YS

United States Patent Office 2,922,504
Patented Jan. 26, 1960

2,922,504

DETECTOR MECHANISM

Harry E. Engleson, Chicago, and Ellsworth A. Hartbauer, Des Plaines, Ill., assignors to F. B. Redington Co., Bellwood, Ill., a corporation of Delaware Application February 1, 1956, Serial No. 562,804

11 Claims. (Cl. 192—125)

This invention relates in general to machinery or mechanism for inserting articles into containers and, more particularly, to mechanism embodying a plurality of inclined chutes or troughs to conduct the articles to a predetermined position. More specifically, the invention relates to mechanisms or devices to arrange articles in a certain manner whereby a predetermined number of articles from each of said chutes or troughs is conveyed for delivery into the containers.

Any type or kind of article for which the present machine is adaptable may be employed, but in the present invention the articles herein shown and referred to are articles in tablet form, such as medicinal tablets.

The invention consists primarily in the provision of electric detector means for determining the presence or absence of a required number of tablets so that it is assured that the correct number of tablets will be inserted in a container, such as a bottle.

A machine for packaging medicinal tablets may include a plurality of inclined troughs or chutes having dimensions such that the individual tablets may roll or pass along the chutes on edge and in single file. The inclined troughs conduct the tablets from a hopper at an upper level to the tablet receiving and inserting mechanism for insertion in bottles carried by a conveyer at a lower level.

In any mechanical operation for packaging a predetermined number of articles, it is desirable to have apparatus for detecting any possible malfunctioning to prevent a machine from discharging incompletely filled packages which may be inadvertently shipped and sold to the public. In the tablet packaging machine using this invention, it is important to provide detecting apparatus to assure that each of the chutes or inclined troughs is filled with and is conducting tablets to the bottle inserting mechanism. Should any one of the chutes run empty, the bottles on the conveyor would fail to receive the proper number of tablets and, in that event, the machine should be stopped or an alarm circuit be energized to prevent the continued malfunctioning of the bottle filling mechanism, which would result in incompletely filled bottles.

It is an object of this invention to provide an improved machine for packaging disk-shaped articles such as medicinal tablets by conducting the articles down inclined chutes or troughs to a container inserting mechanism and to further provide apparatus for mechanically detecting the absence or deficiency of articles in any of the chutes, the detecting apparatus functioning to stop the machine if such a deficiency occurs.

Another object of this invention is to provide an improved detector mechanism for operating an electric circuit which may give an alarm or may stop the machine when any of several chutes conducting tablets to the bottle filling device runs empty; the detector mechanism may include a bar slidably mounted on a support which moves upwardly and downwardly and may further include a plurality of finger members, each of which will probe into a chute; at the beginning of the detecting operation, the support member moves away from the chutes and the slide bar thereon is moved to a switch actuating position, and each of the finger members individually locks the slide bar in that position; the support member is then moved toward the chutes and each of the fingers probes a respective chute; fingers contacting a tablet release the slide bar, but any fingers failing to contact a tablet continue to retain the slide bar in a locked position; thus, if all of the troughs are filled with tablets, then all of the fingers will release the slide bar permitting it to snap back into its initial or non-actuating position, but if any finger fails to contact a tablet and thus fails to release the slide bar, the next subsequent detecting operation will be initiated with the slide bar in position to actuate the electric switch.

A more complete understanding of the present invention, its mode of operation and its advantages may be gathered from further reading of this specification, together with an inspection of the accompanying drawings in which:

Fig. 1 is a plan view of a part of the packaging machine of this invention particularly illustrating the hopper and the troughs for conducting the tablets to a conveyor;

Fig. 2 is a vertical section along the plane 2—2 of Fig. 1;

Fig. 3 is an enlarged section along the broken line 3—3 of Fig. 1 and illustrating in perspective the detector mechanism as it is positioned over the inclined chutes;

Fig. 4 is a section along the plane 4—4 of Fig. 3 showing in perspective the detector assembly including the probe finger members but omitting the trough structure;

Fig. 5 is a fragmentary perspective view of a part of the detector assembly shown in Fig. 3 and including therein a locking device for disabling the finger members;

Fig. 6 is an enlarged vertical section along the plane 6—6 of Fig. 3;

Figure 7:
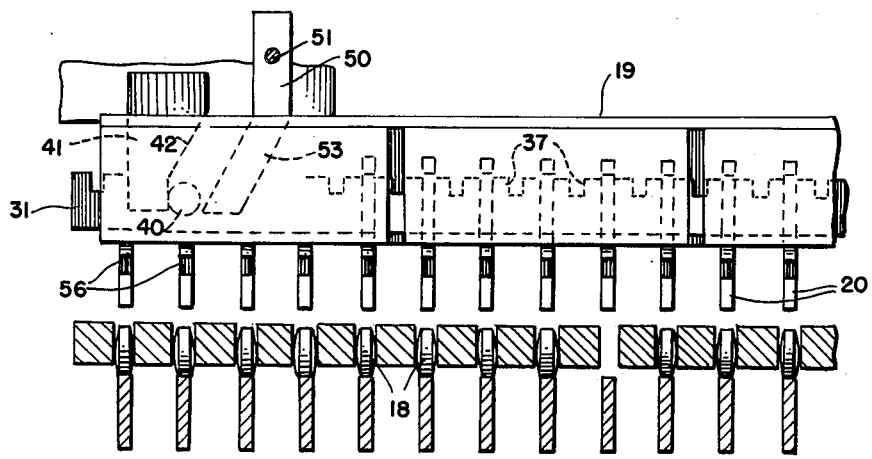
Fig. 7 is an enlarged vertical section along the plane 7—7 of Fig. 1 showing the detector mechanism as the detecting cycle is commencing such that the support member is raising the fingers away from the chutes and such that the slide bar is being cammed and shifted toward a locked position with the fingers.

The tablet packaging machinery is shown generally in Figs. 1 and 2 wherein a hopper 1 may be filled with tablets and a plurality of chutes 2 receive the tablets from the hopper and conduct them to a tablet filling mechanism 3 (Fig. 2). The bottom of the hopper contains a plurality of baffles or guide plates 4 which are inclined and sloped to form the beginning of the chutes 2. A continuous belt 5 extends around a pair of rolls 6 and 7 positioned beneath the hopper 1. The upper reach of the belt 5 is further supported by a plate 8 and forms the bottom of the troughs, the sides of which are formed by the guide plates 4. The upper reach of the belt 5 moves upwardly along the troughs beneath the hopper and tends to carry the tablets contained in the hopper upwardly. Because of the inclination of the troughs, the tablets are urged forwardly and downwardly by gravity and the effect of the upward movement of the belt 5 merely tends to tumble the tablets one over the other thereby breaking up any jams which may be naturally formed by the tablets feeding into the troughs 2. A secondary hopper 9 receives the tablets from the hopper 1 through a clearance space 10 beneath a forward wall 11. The clearance 10 may be adjusted such that the second hopper 9 receives a controlled flow of tablets which are thence expelled through an even smaller clearance 12 in the forward wall 13 of the secondary hopper 9. As the tablets leave the secondary hopper 9, they turn on edge and tend to roll in single file downwardly along the inclined chutes 2.

The chutes 2 terminate with the bottle filling mechanism 3 which comprises a plurality of wheel or disk members 14. A conveyer 15 carries bottles 16 to be filled in a precise spacing beneath the wheels 14. As is indicated in Fig. 2, the conveyer 15 comprises a plurality of pusher members and is adaptable for transporting bottles of several different sizes, as shown at 16. The wheels 14 contain one or more hooked notches 17 dimensioned to receive a single tablet or pill 18 from the troughs 2 as the wheel 14 rotates. The wheel rotates in a counterclockwise direction (Fig. 2) and thus each hooked part 17 receives a tablet 18 and carries it upwardly from the chute 2 over the top of the wheel and thence downwardly ejecting the tablet into the bottle 16. The particular wheel 14 shown in Fig. 2 contains two diametrically opposite hooked parts 17 and this wheel is adapted to receive two tablets from each trough and deposit them in a bottle 16 as the bottle is passed on the conveyer 15. Other wheels 14 may be designed with but a single hooked part 17 and, thus, the bottle would receive but a single tablet from each trough 2.

In a preferred embodiment, the machine depicted in Figs. 1 and 2 may have fifty parallel troughs 2 each terminating in a wheel 14. If each trough is operative in the machine, a single bottle passing along the conveyer 15 will receive either fifty or one hundred tablets, depending on whether the wheels 14 are equipped with a single tablet receiving hooked part 17 or with a pair of hooked parts, as shown in Fig. 2. A machine may be provided with two interchangeable sets of wheels 14 such that the single machine may be employed to fill fifty tablet bottles or one hundred tablet bottles, as may be desired. Furthermore, it is not necessary that all of the fifty tablet chutes 2 be operative. Thus, if twenty of the chutes were blocked and inoperative, this machine could then be employed to fill thirty tablet bottles. As previously stated, the conveyer 15 may be adapted to carry any particular sized bottles corresponding to thirty tablet, fifty tablet, one hundred tablet sizes, or any other given number of tablets within the capacity of the machine.

The detector mechanism of this invention comprises a movable support member 19 carrying a plurality of finger members 20. The support member 19 moves or oscillates upwardly and downwardly such that each of the fingers 20 probes into a corresponding chute 2 to determine if the chute is filled with tablets 18. The linkage for moving the oscillatory support member 19 is shown in Figs. 2 and 3, wherein a crank 21 is rotated on a shaft 22 which also carries and rotates all of the bottle filling wheels 14. The crank 21 reciprocates a rock arm 23 by means of a connecting rod or link 24. The reciprocating motion imparted to the rock arm 23 is conveyed to an arm 25 by a shaft 26 and thence to the support member 19 mounted at the end of the arm 25. A second supporting arm 27, Fig. 3, attached to the support member 19 is fixed to a shaft 28 and to an arm 29 attached to a spring 30. Essentially, the spring 30 serves to counter-balance the weight of the oscillatory support member 19 through the linkage 27, 28, 29. From the above, it is obvious that the support member 19 is oscillated upwardly and downwardly with each revolution of the bottle filling wheels 14 and the crank 21.

A shiftable member or slide bare 31 is slidably mounted within the movable supporting structure 19. A tension spring 32 (see Figs. 4 and 8) is coupled between a protruding part 33 on the support 19 and a protruding part or stud 34 on the slide bar 31. The spring 32 urges the slide bar to the left, as shown in Figs. 3, 5, 7 and 8, and to the right, as shown in Fig. 4.

Figure 8:
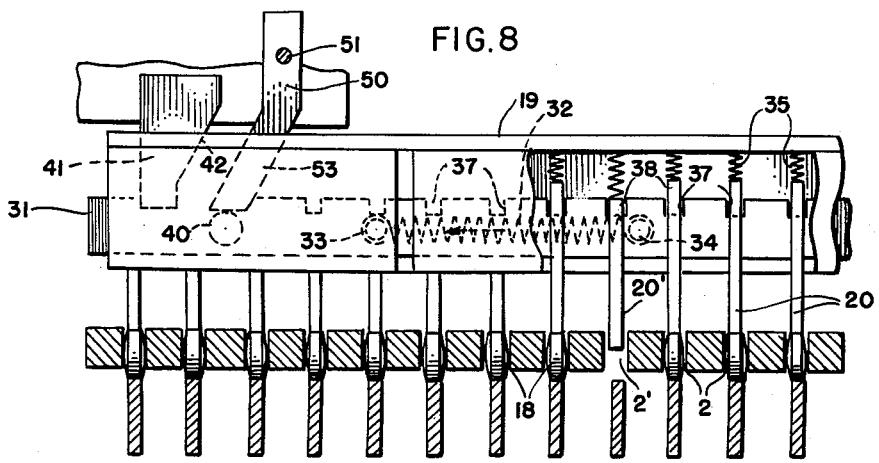
Fig. 8 is a vertical section similar to Fig. 7 but at a subsequent time in the detecting operation, thus showing the fingers probing into the chutes and contacting tablets therein.

Each of the finger members 20 is mounted to slide vertically or transversely to the supporting structure 19 and is urged downwardly by a compression spring 35. The finger members 20 contain a rectilinear slot 36 dimensioned to receive and partially encompass the slide bar 31, thus permitting the bar 31 to slide longitudinally with respect to the fingers 20. The bar 31 contains a plurality of slots or depressions 37 along the top edge thereof (see Fig. 4). The rectilinear slots 36 on the fingers 20 and the slots 37 on the slide bar 31 cooperate to lock the slide bar in an extreme position. Figs. 7 and 8 illustrate the manner in which the slide bar 31 may be moved and locked by all of the finger members 20. It may be noted that as the slide bar 31 is moved to the right, Fig. 8, each of the finger members 20 is in position to drop vertically downwardly such that an upper part 38 of the finger 20 will drop into a corresponding slot 37 of the slide bar. As the support member 19 moves into close proximity with the chutes 2, the finger members 20 will contact any tablets 18 which may be therein. Each finger in contact with a tablet 18 is raised to release the engageable part 38 from the corresponding slot 37. Fig. 8 illustrates the position of contact between the fingers 20 and the tablets 18 and further illustrates one finger 20' which has descended into a vacant chute 2' and thus has failed to contact any tablet. It will be appreciated that the finger 20' will remain in its lowered position and will continue to hold the slide bar 31 although other fingers 20 have been raised.

The slide bar 31 has a stud 39 fixed thereto which may carry a cam roller 40 (see Figs. 4 and 6). A stationary cam 41 has an inclined surface 42 positioned to engage the cam roller 40 as the support member 19 moves upwardly, and thus the stud 39 and the slide bar 31 are cammed or moved to the right, as shown in Figs. 3, 7 and 8, and to the left, as shown in Fig. 4. When the support member 19 has moved to its upper extreme, the slide bar 31 has likewise moved to an extreme position permitting all of the finger members 20 to drop down into the respective slots 37 and thereby lock the slide bar 31. When the support member 19 is thence moved downwardly, the slide bar is locked thereto by the finger members 20 until the lower extreme of motion has been reached, at which time all of the finger members contacting tablets 18 will release the slide bar. If all of the chutes 2 are filled with tablets, then all of the finger members will release the slide bar 31 and it will return to its normal position in response to the urging of the spring 32. If any chute is empty, the slide bar will remain locked and a second upward movement of the support member 19 will cause the bar 31 and its stud 39 to move directly upwardly for operation of an electric switch.

Figure 9:
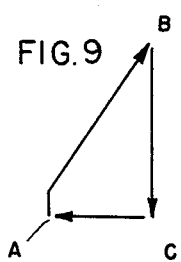
Fig. 9 is a schematic diagram illustrating the movement of the slide member through the cycle of normal operation.
Figure 10:
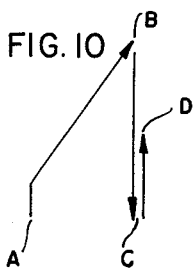
Fig. 10 is a schematic diagram illustrating the movement of the slide member through a cycle wherein an absence of articles has been detected in at least one of the chutes such that an alarm switch will be operated.

Figs. 9 and 10 illustrate schematically the operation of the slide bar 31 and its stud 39. At the initial point A, the slide bar and its operating stud 39 have a position corresponding to the lower left point of the schematic diagrams, Figs. 9 and 10. As the support member 19 raises, the slide bar and stud move upwardly and thence diagonally upwardly and to the right to a point B where the slide bar becomes locked. As the member 19 moves downwardly, the slide bar and stud descend to point C directly beneath point B. Fig. 9 represents the normal operation of the detector wherein all of the chutes are filled with tablets and thus it is seen that the slide bars and stud will move to the left from point C to point A as all of the fingers contact tablets in the chutes. The cycle of Fig. 9 is thus complete and the slide bar is in position to start a subsequent cycle. Fig. 10 represents the motion of the slide bar and the stud 39 when at least one of the chutes has run empty. Thus, at point C, the slide bar is not released and does not return to the initial point A. Upon the next subsequent upward movement of the support member 19, the slide bar and its stud 39 move directly upward to a point D whereupon an electric switch is operated.

Operation of the electric switch structure may be understood with reference to Figs. 3, 7 and 8. The electric switch 43 is mounted on a stationary part of the machine and an electric cable 44 is connected thereto. An operating plunger 45 extends downwardly from the switch and is engaged by an arm of a horizontal lever 46 mounted to pivot about a point 47. A compression spring 48 is positioned between a stationary bracket 49 and the lever 46 such that the right end of the lever 46 (as viewed in Fig. 3) is urged downwardly and the left arm of the lever is urged upwardly maintaining pressure against the plunger 45 of the electric switch 43.

A switch operating dog 50 is mounted to pivot at a point 51 at an end of the switch operating lever 46. A compression spring 52 urges the upper part of the dog 50 to the right and a lower diagonally extending arm 53 to the left, as viewed in Figs. 3, 7 and 8. The dog 50 may pivot such that the lower extension 53 will move to the right (Figs. 3, 7 and 8) against the urging of the compression sprnig 52; but a stop part 54 prevents any pivotal motion to the left. The stop 54 contains a screw adjustment 55 to vary the positioning of the lower diagonal arm 53 of the dog.

In the operation of the detector mechanism of this invention, the movable support 19 raises and the slide bar and stud 39 are cammed to the right (Figs. 3, 7 and 8) into a locked position. The support member 19 thence descends and the stud 39 with its cam roller 40 moves directly downwardly causing the dog 50 to pivot. When the support member 19 has moved to its lowest extreme, the stud and cam roller 40 descend beneath the diagonal extension 53 of the dog 50, and the dog 50 will thence snap back to its normal position, as shown in Fig. 8. If all of the chutes 2 are filled, the slide member 31 will thence move from under the dog extension 53 to the normal starting point for the cycle, and in the subsequent upward movement of the support member 19, the cam roller 40 will not engage the dog 53 but will roll against the cam surface 42. However, if one or more of the chutes 2 are empty, the cam roller 40 will raise directly under the dog extension 53 as the support member begins its upward movement. Since the dog 50 may not pivot in a reverse direction, the upward movement is transmitted to the right arm of the lever 46 (see Fig. 3) and thus the left arm of the lever moves downwardly from the plunger 45 causing operation of the electric switch 43.

The electric switch may be connected to stop the machine or it may be connected to set off an alarm, such as a bell or a signal light, whereby an operator will become aware of the malfunctioning of the machine. If the electric switch is connected to stop the machine, it may be desirable that the machine cease its operation before the chutes 2 run completely empty such that the bottle loading mechanism 3 will fail to insert the required number of tablets into the bottle 16. This may be accomplished by arranging the detector apparatus with its movable support member 19 and with the fingers 20 at a substantial distance from the bottle loading mechanism 3. The chutes 2 thus extend a substantial distance between the detector and the loading wheels and if any chute begins to run empty, the detector will function to stop the machine before the loading wheels 14 run empty.

If it is desired that the machine operate at less than its maximum capacity to fill smaller size bottles, then some of the chutes 2 may be blocked off and not used. Thus, if it were desired to fill bottles with only thirty tablets by this machine which has fifty chutes, then twenty of the chutes must be inoperative. The detector apparatus must be disabled as to those chutes which are inoperative. Fig. 5 illustrates a convenient means for disabling the detector fingers 20.

Each detector finger contains a shank portion having a second slot 56 therein. A lock member 57 comprises a lightweight bar with a horizontally extending flange 58 at its lower extremity. This bar may be fastened to the support member by any conventional means such as stud screws 59. When the lock bar 57 is properly secured to the movable support 19, the flange 58 extends into the slots 56 on each of the finger members 20 and, therefore, the finger members are immobilized. The finger members may thus be held upwardly against the urging of the compression spring 35, regardless of the slide position of the bar 31. These finger members being held in the unlocked position, are thus disabled and will not function to probe the troughs 2 or to lock the slide bar 31.

The lock bar 57 may be of any convenient length extending partially across the support member 19 and may thus disable any desired number of probe fingers 20 and leave the remainder of the fingers for normal operation.

It will be appreciated that the probing operations need not be synchronized with the movement of the bottle filling wheels 14. Furthermore, it is not necessary that the detector apparatus operate with the rapidity of the bottle loading mechanism 3. If the chutes 2 have sufficient length, a slowly operating detector can determine that any particular chute is beginning to run empty and thence cause the machine to stop before even a more rapidly operating bottle inserting mechanism 3 fails to receive its supply of tablets.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. In a machine having a plurality of chutes for conducting articles, apparatus for mechanically detecting an absence of articles in any of the chutes, said apparatus comprising a support member, means for moving said support member toward and away from the chutes, a member shiftably mounted on the support member, and a plurality of finger members movably mounted on the support member in alignment with the open ends of the chutes, said finger members and said shiftably mounted member having coacting parts engageable for retaining said shiftably mounted member in a locked position, means including each of said finger members being operable to probe into one of the chutes as the support member moves toward said chutes and said parts thereon being further operable to disengage from the parts on the shiftably mounted member upon contact with an article in the probed chute, a switch means for controlling the operation of the machine, and means on said shiftable member for engaging said switch means should a finger member fail to contact an article in its corresponding chute and disengage the shiftable member.

2. In a machine having a plurality of chutes for conducting articles, apparatus for detecting an absence of articles in any of the chutes, said apparatus comprising a support member, a shiftable member slidably mounted on the support member, a plurality of finger members movably mounted on the support member, said support member being movable toward and away from the chutes whereby the finger members probe in to the chutes for contacting articles therein, means associated with the shiftable member for urging said shiftable member into a first position on the support member, cooperating means on the shiftable member and on each of the finger members for locking the shiftable member in a second position on the support member, means for moving said shiftable member to said second position upon movement of said support member away from said chutes, each of said finger members being independently operative through the cooperating locking means to retain the shiftable member in the second position upon failure to contact an article in a probed chute, and means associated with the shiftable member for stopping the machine when the support member is moved from the chutes with the shiftable member retained in the second position.

3. In a machine having a plurality of chutes for conducting articles, apparatus for mechanically detecting an absence of articles in any of the chutes, said apparatus comprising an oscillatory support member movable toward and away from the chutes, a slide bar mounted to move longitudinally along the support member, a plurality of probe fingers movably mounted on the support member and adapted to probe into the chutes and to contact articles therein, cooperating means on the slide bar and on each of the probe fingers for holding the slide bar in a locked position on the support member and for releasing the slide bar when the finger contacts an article in the chute, means for urging the slide bar toward an unlocked position on the support member, and switch actuating means responsive to the positioning of the slide bar as the support member moves away from the chutes, said switch actuating means operable to stop said machine upon detection of the absence of articles in a chute.

4. In a machine having a plurality of chutes for conducting articles, apparatus for mechanically detecting an absence of articles in any of the chutes, said apparatus comprising an oscillatory support member movable toward and away from the chutes, a slide bar mounted to move longitudinally along the support member, a plurality of probe fingers movably mounted on the support member and adapted to probe into the chutes and to contact articles therein, cooperating means on the slide bar and on each of the probe fingers for holding the slide bar in a locked position on the support member and for releasing the slide bar when each finger contacts an article in a chute, spring means coupled between the support member and the slide bar for urging the support member toward an unlocked position, and an electric switch for stopping the machine having a switch operating means, said slide bar having a part engageable with the switch operating means and operable to move the switch operating means as the support member moves from the chutes with the slide bar held in the locked position thereby stopping the machine.

5. In a machine having a plurality of chutes for conducting articles, apparatus for mechanically detecting an absence of articles in any of the chutes, said apparatus comprising an oscillatory support member movable toward and away from the chutes, a slide bar mounted to move longitudinally along the support member, a plurality of probe fingers movably mounted on the support member and adapted to probe into the chutes and to contact articles therein, cooperating means on the slide bar and on each of the probe fingers for holding the slide bar in a locked position on the support member and for releasing the slide bar when each finger contacts an article in a chute, spring means coupled between the support member and the slide bar for urging the slide bar toward an unlocked position, an electric switch for stopping the machine, a pivotally mounted lever having a leg operatively engaging the electric switch, and a dog pivotally mounted on the lever and extending into spaced relation with the support member and with the slide bar, said slide bar having a part engageable with the dog, said dog being operable to pivot as the support member moves toward the chutes thereby permitting the engageable part of the slide bar to bypass the dog, said dog being further operable to move the lever and operate the electric switch upon being engaged by said part on said slide when the support member moves from the chutes and when the slide bar remains in the locked position.

6. In a machine having a plurality of inclined chutes for conducting articles downwardly, apparatus for mechanically detecting an absence of articles in any of the chutes, said apparatus comprising a movable support member, drive means operatively associated with the support member to oscillate the support member between a position of predetermined spaced relation with the chutes and a position of a greater predetermined spaced relation with the chutes, a slide bar mounted longitudinally along the support member, said slide bar being movable along the support member between a first position and a second position thereon, means for moving the slide bar from the first position to the second position on the support member as the support member moves away from the chutes, a spring coupled to the support member and to the slide bar for urging the slide bar into the first position, a plurality of finger members movably mounted on the support member and adapted to probe into the chutes and to contact articles therein, cooperating means on the slide bar and on each of the finger members for locking the slide bar in the second position and for releasing the slide bar when each of the finger members contact an article, an electric switch controlling the operation of the machine, switch operating means associated with the switch, said switch operating means including a dog member in spaced relation with the support member and the slide bar, said slide bar having a part engageable with the dog member when in its second position, whereby said slide bar is moved to and locked in the second position with each movement of the support member away from the chutes and is operable to move the switch operating means should any one finger fail to engage an article and release the slide bar prior to a subsequent movement away from the chutes.

7. The apparatus according to claim 6 wherein the means for moving the slide bar from the first position to the second position comprises a stationary cam positioned to engage a part of the slide bar and to move the slide bar against the urging of the spring as the support member moves away from the chutes.

8. In a packaging machine having a plurality of inclined chutes for conducting tablets downwardly, apparatus for mechanically detecting an absence of tablets in any of the chutes, said apparatus comprising a movable support member, drive means operatively associated with the support member for oscillating the support member to a position of predetermined spaced relation with the chutes and a position of a greater predetermined spaced relation with the chutes, a slide bar mounted longitudinally along the support member, said slide bar being movable along the support member between a first position and a second position thereon, a spring coupled to the support member and to the slide bar for urging the slide bar toward the first position, a plurality of finger members corresponding in number to the chutes, slidably mounted on the support member and positioned to probe into the chutes and to contact tablets therein, said finger members each having a stop part, said slide bar having a plurality of slots for receiving the stop part of the finger members whereby the slide bar may be locked in the second position, each of said finger members being operative to slide upon contact with a tablet and to disengage the stop part from the slot on the slide bar, an electric switch controlling the operation of the machine, switch operating means associated with the switch, said switch operating means including a dog member in spaced relation with the support member and the slide bar, said slide bar having a protruding stud engageable with the dog member, a stationary cam in spaced relation to the stud on the slide bar for moving the slide bar from the first position to the second position as the support member is moved away from the chutes, said finger members locking the slide bar in the second position as the support member moves toward the chutes and said dog being operative to pivot and to permit the stud on the slide bar to bypass the dog, the stud on the slide bar being thence operative to move the dog and the switch operating means during the next subsequent oscillation of the support member should the slide bar remain locked in the second position upon the failure of any one finger member to engage a tablet in its corresponding chute.

9. The apparatus according to claim 8 wherein is included a member for disabling a predetermined number of the slidably mounted finger members, said disabling member and said finger members having cooperating means for retaining the finger members in a position disengaged from the slide bar.

10. The apparatus according to claim 8 wherein is included a disabling bar having a flange thereon, said disabling bar being adapted to be mounted on the support member, each of said finger members having a slot for receiving the flange of said disabling bar whereby the fingers are retained in a position disengaged from the slide bar.

11. In a machine having a plurality of chutes for conducting articles and having a detector assembly for detecting the absence of articles in said chutes including a support movable toward and away from said chutes and a member shiftably mounted on the support, means for shifting said shiftably mounted member from a normal position to a locked position a finger member movably mounted on the support, said finger member comprising a probe end for probing into one of the chutes when the support moves into a predetermined spaced relation therewith, a stop part at the end remote from the probe end, a depression on said shiftably mounted member aligned with said stop part said stop part normally being engageable with said depression of the shiftably mounted member for retaining said member shiftably mounted in the locked position as the support moves towards the chutes, means disengaging said stop part from said depression of said shiftably mounted member when the probe end of said finger member engages an article in its respective chute upon movement of said support toward said chutes, control means for rendering said machine non-operative and means on said shiftable member for operating said control means should a finger detect the absence of an article in its corresponding chute thereby maintaining the shiftable member in locked position.

References Cited in the file of this patent

UNITED STATES PATENTS

| | | |
|---|---|---|
| 1,555,596 | Miller | Sept. 29, 1925 |
| 1,852,924 | Fowler | Apr. 5, 1932 |
| 2,046,800 | Toolan | July 7, 1936 |
| 2,425,438 | O'Neal | Aug. 12, 1947 |
| 2,505,468 | Forca | Apr. 25, 1950 |
| 2,656,962 | Daniels | Oct. 27, 1953 |

UNITED STATES PATENT OFFICE
CERTIFICATE OF CORRECTION

Patent No. 2,922,504                                      January 26, 1960

Harry E. Engleson et al.

It is hereby certified that error appears in the printed specification of the above numbered patent requiring correction and that the said Letters Patent should read as corrected below.

Column 2, line 47, for "simililar" read -- similar --; column 4, line 3, for "bare" read -- bar --; column 5, line 30, for "sprnig" read -- spring --; column 6, line 71, for "in to" read -- into --; column 8, line 28, for "the", second occurrence, read -- said --.

Signed and sealed this 16th day of August 1960.

(SEAL)
Attest:

KARL H. AXLINE
Attesting Officer

ROBERT C. WATSON
Commissioner of Patents